United States Patent [19]
Mast

[11] 4,247,168
[45] Jan. 27, 1981

[54] ZOOM LENS FOR PHOTOGRAPHIC PRINTERS

[75] Inventor: Fred Mast, Wil, Switzerland

[73] Assignee: Gretag Aktiengesellschaft, Regensdorf, Switzerland

[21] Appl. No.: 955,250

[22] Filed: Oct. 27, 1978

[30] Foreign Application Priority Data

Nov. 15, 1977 [CH] Switzerland ............. 13922/77

[51] Int. Cl.³ ............... G02B 7/10; G02B 15/14
[52] U.S. Cl. .................... 350/430; 350/423
[58] Field of Search ........... 350/187, 184, 186, 209, 350/220, 255; 355/55, 58

[56] References Cited

U.S. PATENT DOCUMENTS

| 1,947,669 | 2/1934 | Warmisham et al. | 350/184 |
| 2,159,394 | 5/1939 | Mellor et al. | 350/187 |
| 2,663,223 | 7/1950 | Hopkins | 350/187 |
| 3,625,595 | 12/1971 | Fleischman | 350/184 |
| 3,752,565 | 8/1973 | Nagashima | 350/255 |
| 3,883,228 | 5/1975 | Betensky | 350/184 |
| 3,973,831 | 8/1976 | Minovra | 350/184 |

FOREIGN PATENT DOCUMENTS 398307 9/1933 United Kingdom .

Primary Examiner—Jon W. Henry
Attorney, Agent, or Firm—Burns, Doane, Swecker & Mathis

[57] ABSTRACT

A three-component zoom lens in which the middle component is axially adjustable and has a positive refractive power which in absolute terms is at least twice that of the other two lens components. A diaphragm is disposed in the movable middle component. For image position correction, means kinematically coupled to the middle component are provided for the joint axial displacement of all three lens components.

9 Claims, 4 Drawing Figures

ZOOM LENS FOR PHOTOGRAPHIC PRINTERS

FIELD OF THE INVENTION

This invention relates to a zoom lens comprising three components located in a mount, and a diaphragm positioned in one of the components, the middle component being axially adjustable relative to and between the other two components.

PRIOR ART

Variable-magnification lenses, i.e. zoom lenses, have long been known for photographic cameras. On the other hand, there are few, if any such lens available with satisfactory properties for photographic printers. The reasons for this are due particularly to the much higher quality requirements for printers, and such requirements can be satisfied only with difficulty, if at all, with the known photographic zoom lenses. For example, lenses for printers must have a correction power far in excess of that of a camera lens. Printer lenses must be free from vignetting over the entire diaphragm range, and must be colour-corrected from 400 to 750 mm (camera lenses are usually colour-corrected only up to 650 nm). In addition, they must have a relatively short overall length because space conditions are frequently restricted in printers.

Zoom lenses usually consist of a fixed front component, a fixed back component, and a middle component movable between the two. The latter component is usually divided into two parts, which can also be adjusted relatively to one another to give a fixed image plane position. In zoom lenses for photographic cameras, the middle component usually has a negative and highly refractive power in order to keep to the minimum the displacement movement required for a specific range of magnification. Since the total lens refractive power must be positive, the other two zoom lens components have relatively high positive refractive powers, the back component usually having the greater refractive power and also containing the diaphragm.

OBJECT OF THE INVENTION

The object of the invention is to provide a zoom lens which satisfies the conditions required for the quality requirements conventional in the case of printers, and is accordingly suitable for printers.

SUMMARY OF THE INVENTION

To this end, according to the invention, the middle component has a positive refractive power and, in absolute terms, the greatest refractive power. Preferably, the refractive power of the middle component is, in absolute terms, at least twice the refractive power of the other two components. As a result of this distribution of refractive powers of the components, each can be kept lower and the lens aberrations can thus be corrected more satisfactorily and more easily. Also, the movable middle component has a relatively short travel as a result so that the overall length of the lens is kept small.

In camera lenses the lens diaphragm must be kept at a fixed distance from the film so that the intensity of illumination does not vary when the magnification changes. To transfer this consideration to a zoom lens for printing machines would mean keeping the diaphragm at a fixed distance from the paper plane to give a constant paper illumination intensity. However, in modern printing machines with automatic exposure control, this requirement of constant illumination intensity is unnecessary, so that printing machines can dispense with a fixed diaphragm position. Accordingly, unlike camera lenses, the zoom lens diaphragm need not be fitted in the front component but in the movable middle component. The diaphragm is thus situated in the component having the maximum refractive power, and this greatly simplifies correction.

FURTHER PRIOR ART

A lens similar in some respects to the lens according to the invention is disclosed in U.S. Pat. No. 4,009,928. This lens is designed for infra-red systems and for that reason alone is unsuitable for printing machines, for which there are much greater quality requirements. The most important difference however, as will be seen from the given lens element data is that in this known lens it is not the middle component, but the back component, which has the greatest refractive power in absolute terms. Nor does this lens have a diaphragm, at least not in the middle component.

Another zoom lens is disclosed in French Patent specification No. 2,343,268, corresponding to the U.S. Pat. No. 4,056,308. This lens has two movable middle components which are constrained to be symmetrically adjustable. The two middle components have a negative refractive power and, in absolute terms, a lower refractive power than the other two components.

DAS No. 2,036,285 discloses a variable lens having a middle component with positive refractive power. In this lens, however, the back component has a much greater refractive power and the diaphragm is located in the back component.

German Patent specification No. 650,907 discloses a two-element zoom attachment for a standard lens. This attachment itself has no refractive power. No details are given as to the refractive power ratios between the movable component and the back component formed by the standard lens, which is not defined in any greater detail. In addition, this known zoom attachment has no diaphragm.

Another zoom lens is disclosed in U.S. Pat. No. 2,663,223. It has a two-part movable middle component of negative refractive power, a back component and a front component each having positive refractive power, that of the back component being the greater in absolute terms.

Other lenses are disclosed in U.S. Pat. No. 3,436,145 and 3,495,895. The lenses described therein are 1:1 lenses with a very slight change of focal lengths, have a completely different construction, and are not suitable for printing machines.

BRIEF DESCRIPTION OF THE DRAWINGS

A preferred embodiment of the invention will now be described in detail hereinafter with reference to the accompanying drawings.

DETAILED DESCRIPTION OF PREFERRED EMBODIMENT

Figure 1:
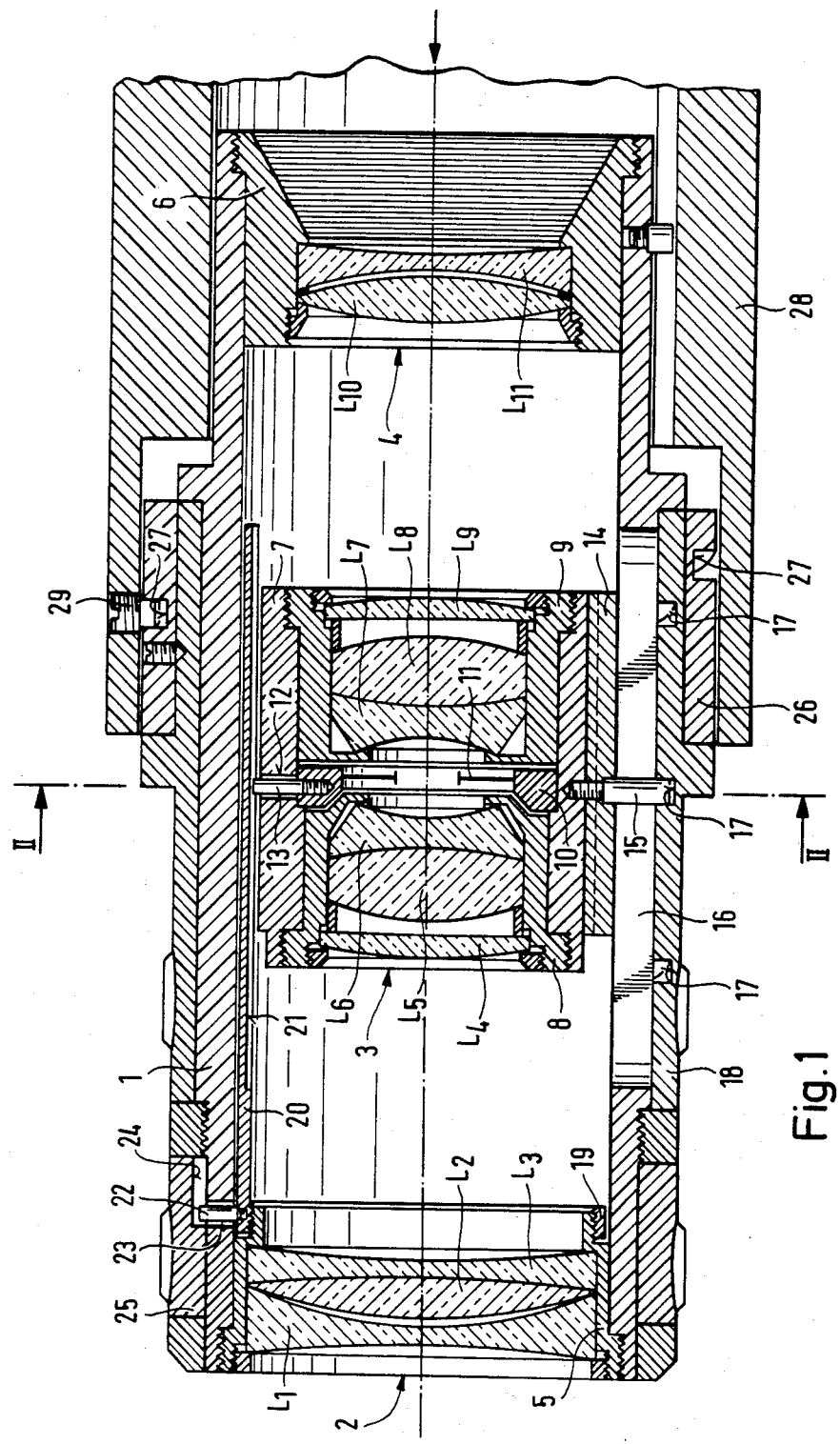
FIG. 1 is an axial section through one embodiment of a zoom lens according to the invention.
Figure 2:
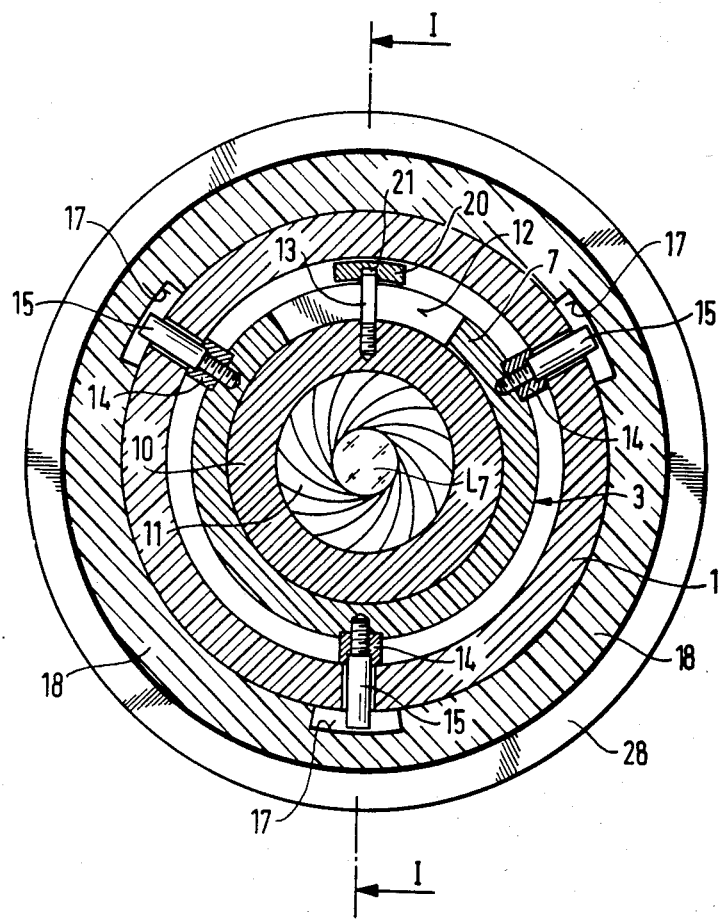
FIG. 2 is a section on the line II—II in FIG. 1.

The zoom lens shown in FIGS. 1 and 2 comprises three components disposed in a common tubular mount 1, i.e. a three-element front component 2, a six-element middle component 3 and a two-element back component 4. The elements $L_1$ to $L_3$ of the front component 2 and the elements $L_{10}$ to $L_{11}$ of the back component 4 are disposed in mounts 5 and 6 respectively which are fixed at the opposite ends of the lens mount 1.

The elements $L_4$ to $L_9$ of the middle component are mounted in a mount consisting of an outer tube 7 and two bushings 8 and 9 mounted therein. An adjustable iris diaphragm 10 is disposed between the two bushings and comprises blades 11 and a control 13 extending through a peripheral slot 12 in the outer tube 7.

Three axially extending rails or runners 14 offset by 120° intervals are fixed on the outer tube 7 and the middle component slides thereon in the lens mount. Three guide pins 15 extend radially outwards from the rails 14 and engage in each case through a longitudinal slot 16 in the lens mount 1 into each of three helical guide grooves 17 disposed on the inside of an adjusting sleeve 18 which is mounted to be rotatable and axially non-displaceable on the lens mount 1. The guide grooves 17 have a pitch such that turning of the sleeve 18 through 360° relative to the lens mount 1 causes the middle component 3 to be moved by the maximum amount, which is in this case 78 mm.

A diaphragm adjusting sleeve 19 is mounted rotatably in an annular gap formed between a sleeve-like projection of the mount 5 of the front component 2 and the inner wall of the lens mount 1. The sleeve 19 has an axially extending driver projection 20 with a longitudinal slot 21 in which the control 13 of the iris diaphragm 10 engages. A pin 22 extends radially outwards from the sleeve 19 through a peripheral slot 23 in the lens mount 1 into a longitudinal slot 24 of a diaphragm adjusting ring 25 mounted rotatably on the lens mount 1. Turning of this ring relative to the lens mount 1 thus enables the iris diaphragm 10 in the middle component 3 to be adjusted independently of the axial position of the latter.

Figure 3:
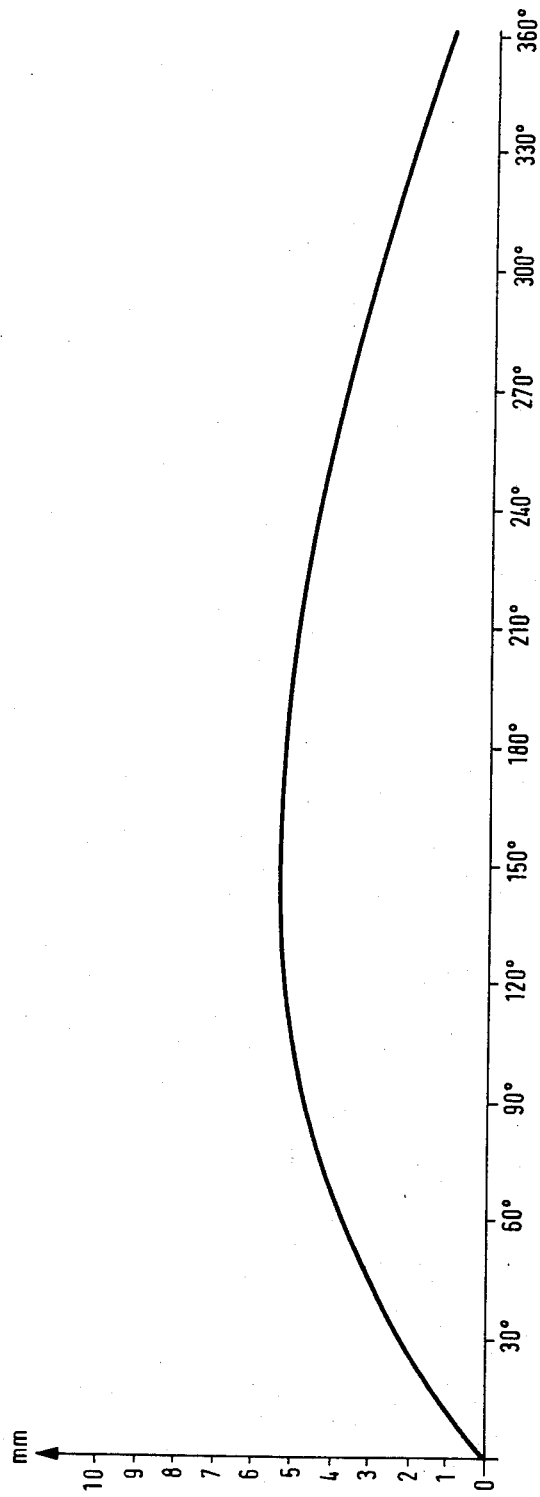
FIG. 3 is a graph explaining a detail of FIG. 1.

Another sleeve 26 is disposed so as to be non-rotatable and non-displaceable on the adjusting sleeve 18 for the middle component 3. Sleeve 26 has a guide groove 27 with the parabola-like configuration shown in FIG. 3. The rotary positions 0° and 360° relate to the two end positions of the middle component 3. The lens mount 1 and hence the entire lens is mounted to be slideable in a guide tube 28. The latter has a cam follower element 29 engaging in the guide groove 27 of the sleeve 26. Turning of the adjusting sleeve 18 for the middle component 3 thus simultaneously causes axial adjustment of the complete lens, i.e. all three lens components jointly, according to the shape of the guide groove 27. In this way the position of the image is automatically corrected for each magnification to which the lens is set. In comparison with the known lenses, this type of image position correction has the advantage of easier adjustability and a smaller number of moving elements.

The guide tube 28 may be part of the lens itself or a part of the device in which the lens is to be used. The guide groove 27 may, of course, also be disposed directly in the guide tube 28 and the cam follower element 29 may correspondingly be disposed on the sleeve 26 or the adjusting sleeve 18.

Figure 4:
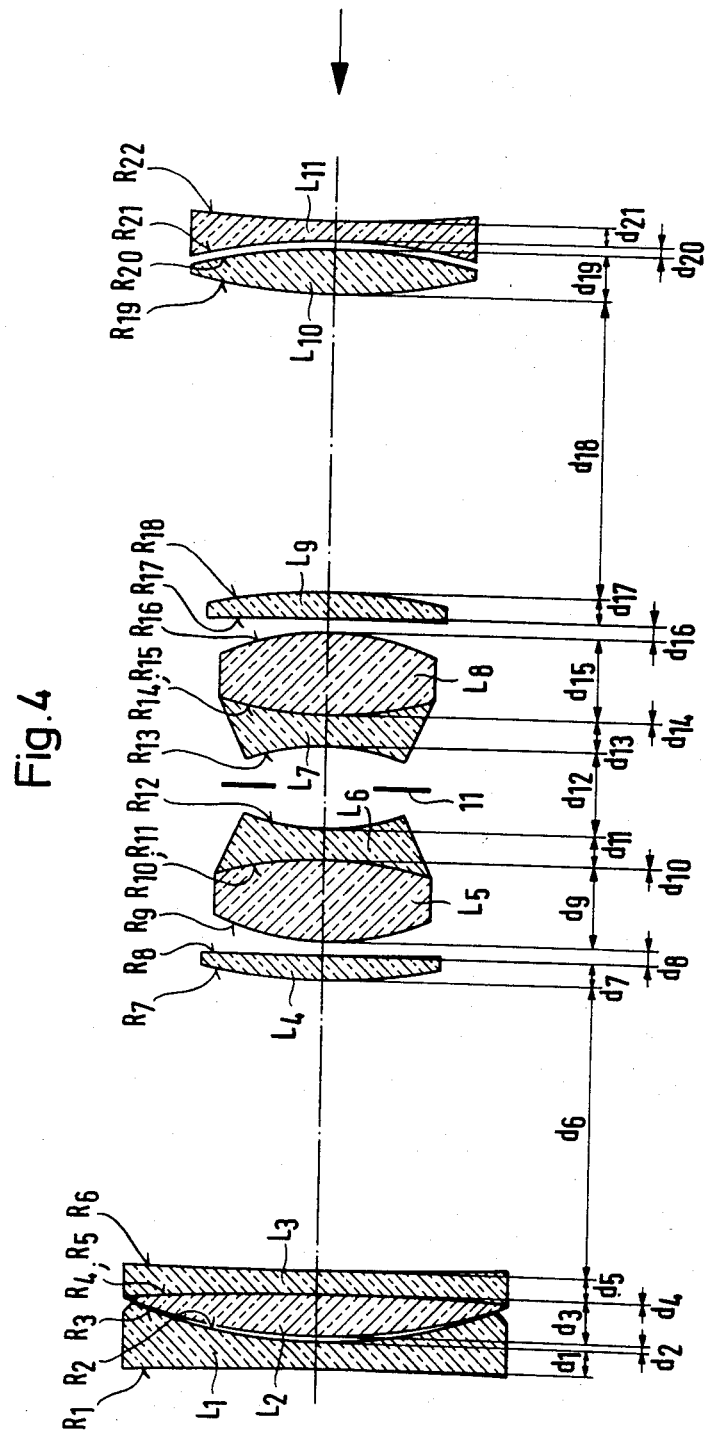
FIG. 4 is a diagrammatic view of the lens element arrangement.

The optical construction of the lens is shown in FIG. 4. The characteristics of the elements and the distances in millimeters between them are as follows:

| Lens element | | Radius | $n_d$ | $\nu_d$ |
|---|---|---|---|---|
| $L_1$ | $R_1$ | −289,83 | 1,62041 | 60,33 |
| | $R_2$ | +72,21 | | |
| $L_2$ | $R_3$ | +84,2 | 1,65412 | 39,63 |
| | $R_4$ | −436,8 | | |
| $L_3$ | $R_5$ | −436,8 | 1,62041 | 60,33 |
| | $R_6$ | +270,12 | | |
| $L_4$ | $R_7$ | +81,01 | 1,74400 | 44,77 |
| | $R_8$ | +8750 | | |
| $L_5$ | $R_9$ | +40,92 | 1,65160 | 58,52 |
| | $R_{10}$ | −65,45 | | |
| $L_6$ | $R_{11}$ | −65,45 | 1,65412 | 39,63 |
| | $R_{12}$ | +28,79 | | |
| $L_7$ | $R_{13}$ | −28,79 | 1,65412 | 39,63 |
| | $R_{14}$ | +65,45 | | |
| $L_8$ | $R_{15}$ | +65,45 | 1,65160 | 58,52 |
| | $R_{16}$ | −40,92 | | |
| $L_9$ | $R_{17}$ | −8750 | 1,74400 | 44,77 |
| | $R_{18}$ | −81,01 | | |
| $L_{10}$ | $R_{19}$ | +95 | 1,62041 | 60,33 |
| | $R_{20}$ | −70,36 | | |
| $L_{11}$ | $R_{21}$ | −74,2 | 1,61340 | 44,30 |
| | $R_{22}$ | +175,04 | | |

$d_1 = 3,25$    $d_8 = 1,73$    $d_{15} = 11,66$
$d_2 = 0,76$    $d_9 = 11,66$    $d_{16} = 1,73$
$d_3 = 6$    $d_{10} = 0$    $d_{17} = 3,78$
$d_4 = 0$    $d_{11} = 4,32$    $d_{18} = 82,60 \div 4,5$
$d_5 = 3$    $d_{12} = 12$    $d_{19} = 6,5$
$d_6 = 2,5 \div 80,6$    $d_{13} = 4,32$    $d_{20} = 0,5$
$d_7 = 3,78$    $d_{14} = 0$    $d_{21} = 3$ $R_1$ to $R_{22}$ are the radii of curvature of the elements $L_1$ to $L_{11}$ in millimeters as shown in FIG. 4 while $d_1$ to $d_{21}$ are the distances (also shown in FIG. 4) between the apices of each pair of adjacent lens element surfaces in millimeters. $n_d$ and $\gamma_d$ is the refractive index of the glass used, referred to the helium-d-line (587.56 mm). $\gamma_d$ is the Abbe index $(n_d-1) : (n_F-n_c)$, referred to the above mentioned helium-d-line, the hydrogen-F-line (486.13 mm) and the hydrogen-c-line (656.27 mm). KZ-FS glasses (short-heavy-flint), which greatly reduce the secondary spectrum, are used for the elements $L_2$, $L_6$, $L_7$ and $L_{11}$ for better colour correction.

The refractive power of the front component (elements $L_1$ to $L_3$) is weakly negative, that of the back component ($L_{10}$ and $L_{11}$) weakly positive, and that of the movable middle component ($L_4$ to $L_9$) containing the diaphragm 10 is highly positive. In comparison with conventional lenses in which only the middle component has a negative refractive power and the back and front components have a strong positive refractive power, the element aberrations with this refractive power distribution can be corrected much more satisfactorily and easily. Furthermore, the movement of the middle component required for a specific range of variation of the magnification, and hence the total length of the lens, can be kept relatively small. Very favourable conditions can be obtained if the refractive power of the middle component in absolute terms is at least twice that of the refractive powers of the other two components of the lens. With the construction of the front and back components shown, the distortion occurring is minimal.

I claim:

1. A three-component zoom lens for photographic printers comprising:

a lens mount mounting a front component, a rear component and a middle component, said front and rear components being mounted at a fixed distance from each other;

means for axially adjusting the middle component relative to and between the front and rear components a diaphragm located within one of said components;

said middle component having a positive refractive power and, in absolute terms, the greatest refractive power.

2. A lens according to claim 1, wherein the refractive power of the middle component, in absolute terms, is at least twice that of the refractive powers of the other two components.

3. A lens according to claim 1, wherein the diaphragm is in the middle component.

4. A lens according to claim 3, including means kinematically coupled to the middle component for common axial displacement of all three lens components.

5. A lens according to claim 4, wherein said displacement means comprise a displacement sleeve fixed to the lens mount, said sleeve including a guide groove for a fixed follower element which is provided at the place of use.

6. A lens according to claim 5, wherein said means for adjusting the middle component comprise, an adjusting sleeve rotatably mounted and axially non-displaceable on the lens mount, said adjusting sleeve having on the inside at least one helical guide groove, and wherein the lens mount has a longitudinal slot therein, and said middle component is mounted to be non-rotatable in the lens mount and has at least one cam follower element engaging in the adjusting sleeve guide groove through said longitudinal slot.

7. A lens according to claim 3, wherein the middle component is mounted non-rotatably in the lens mount, and wherein the diaphragm includes diaphragm control rotatable about the axis of the middle component, said lens further including an diaphragm adjusting sleeve having an axially extending projection rotatably mounted in the lens mount and provided with a longitudinal slot into which the diaphragm control engages, and a diaphragm adjusting ring disposed rotatably on the lens mount and connected non-rotatably to the diaphragm adjusting sleeve.

8. A lens according to claim 7, wherein the middle component has at least three axially extending rails on which it slides in the lens mount.

9. A lens according to claim 1, wherein the middle component has six elements and the front and rear components have three and two elements respectively, with the following characteristics, all dimensions being expressed in millimeters;

| Lens element | | Radius | $n_d$ | $\nu_d$ |
|---|---|---|---|---|
| $L_1$ | $R_1$ | −289,83 | 1,62041 | 60,33 |
| | $R_2$ | +72,21 | | |
| $L_2$ | $R_3$ | +84,2 | 1,65412 | 39,63 |
| | $R_4$ | −436,8 | | |
| $L_3$ | $R_5$ | −436,8 | 1,62041 | 60,33 |
| | $R_6$ | +270,12 | | |
| $L_4$ | $R_7$ | +81,01 | 1,74400 | 44,77 |
| | $R_8$ | +8750 | | |
| $L_5$ | $R_9$ | +40,92 | 1,65160 | 58,52 |
| | $R_{10}$ | −65,45 | | |
| $L_6$ | $R_{11}$ | −65,45 | 1,65412 | 39,63 |
| | $R_{12}$ | +28,79 | | |
| $L_7$ | $R_{13}$ | −28,79 | 1,65412 | 39,63 |
| | $R_{14}$ | +65,45 | | |
| $L_8$ | $R_{15}$ | +65,45 | 1,65160 | 58,52 |
| | $R_{16}$ | −40,92 | | |
| $L_9$ | $R_{17}$ | −8750 | 1,74400 | 44,77 |
| | $R_{18}$ | −81,01 | | |
| $L_{10}$ | $R_{19}$ | +95 | 1,62041 | 60,33 |
| | $R_{20}$ | −70,36 | | |
| $L_{11}$ | $R_{21}$ | −74,2 | 1,61340 | 44,30 |
| | $R_{22}$ | +175,04 | | |

$d_1 = 3,25$   $d_8 = 1,73$   $d_{15} = 11,66$
$d_2 = 0,76$   $d_9 = 11,66$   $d_{16} = 1,73$
$d_3 = 6$   $d_{10} = 0$   $d_{17} = 3,78$
$d_4 = 0$   $d_{11} = 4,32$   $d_{18} = 82,60 \div 4,5$
$d_5 = 3$   $d_{12} = 12$   $d_{19} = 6,5$
$d_6 = 2,5 \div 80,6$   $d_{13} = 4,32$   $d_{20} = 0,5$
$d_7 = 3,78$   $d_{14} = 0$   $d_{21} = 3$ where $R_1$ to $R_{22}$ denote the 22 radii of the total of 11 elements in consecutive numbering starting from the outermost element of the three element component, and $d_1$ to $d_{21}$ the distances between the apices of each pair of adjacent element surfaces, in continuous numbering starting from the said outermost lens element, and $n_d$ and $\gamma_d$ are the refractive index and the Abbe index referring to the helium-d-line and the helium-d-line, the hydrogen-F-line and the hydrogen-c-line respectively.

* * * * *